(12) United States Patent
Hill

(10) Patent No.: US 8,833,820 B1
(45) Date of Patent: Sep. 16, 2014

(54) DETACHABLE HANDPIECE

(71) Applicant: James Hill, Tulsa, OK (US)

(72) Inventor: James Hill, Tulsa, OK (US)

( * ) Notice: Subject to any disclaimer, the term of this patent is extended or adjusted under 35 U.S.C. 154(b) by 0 days.

(21) Appl. No.: 13/998,412

(22) Filed: Oct. 30, 2013

(51) Int. Cl.
*A45F 5/00* (2006.01)
*A45F 5/10* (2006.01)

(52) U.S. Cl.
CPC ........... *A45F 5/10* (2013.01); *A45F 2200/0525* (2013.01); *Y10S 224/93* (2013.01)
USPC .............. 294/25; 294/165; 224/218; 224/930

(58) Field of Classification Search
CPC ................ A45F 2200/0516; A45F 2200/0525; A45F 5/10; H04M 1/0281
USPC .............. 294/15, 25, 137, 165, 212; 224/217, 224/218, 930; 16/422, 430
See application file for complete search history.

(56) References Cited

U.S. PATENT DOCUMENTS

| | | | |
|---|---|---|---|
| 6,360,928 B1 * | 3/2002 | Russo | 224/218 |
| 7,942,293 B2 * | 5/2011 | Lawrence et al. | 224/218 |
| D673,573 S | 1/2013 | Skene et al. | |
| D675,627 S | 2/2013 | Rouser | |
| D676,851 S | 2/2013 | Finnegan et al. | |
| D687,832 S | 8/2013 | Edwards et al. | |
| D687,835 S | 8/2013 | Gittins | |
| D691,146 S | 10/2013 | Perez | |
| 8,550,317 B2 * | 10/2013 | Hyseni | 224/197 |
| 2007/0139874 A1 | 6/2007 | Tanaka | |
| 2011/0266316 A1 * | 11/2011 | Ghalib et al. | 224/217 |
| 2012/0297575 A1 | 11/2012 | Garcia | |
| 2012/0319414 A1 * | 12/2012 | Potter et al. | 294/25 |
| 2013/0069381 A1 * | 3/2013 | Sakamoto | 294/142 |
| 2013/0105662 A1 | 5/2013 | Cote | |

* cited by examiner

*Primary Examiner* — Dean Kramer
(74) *Attorney, Agent, or Firm* — Randal D. Homburg

(57) ABSTRACT

A detachable handpiece coupling by a detachable fabric to a flat surface device, electronic tablet or notebook, or other object held in front of a user, the device conforming to a left or right hand of the user with a selected padded insert within a narrow end of the handpiece to reduce the inner portion of the handpiece to further conform to the user's hand.

9 Claims, 3 Drawing Sheets

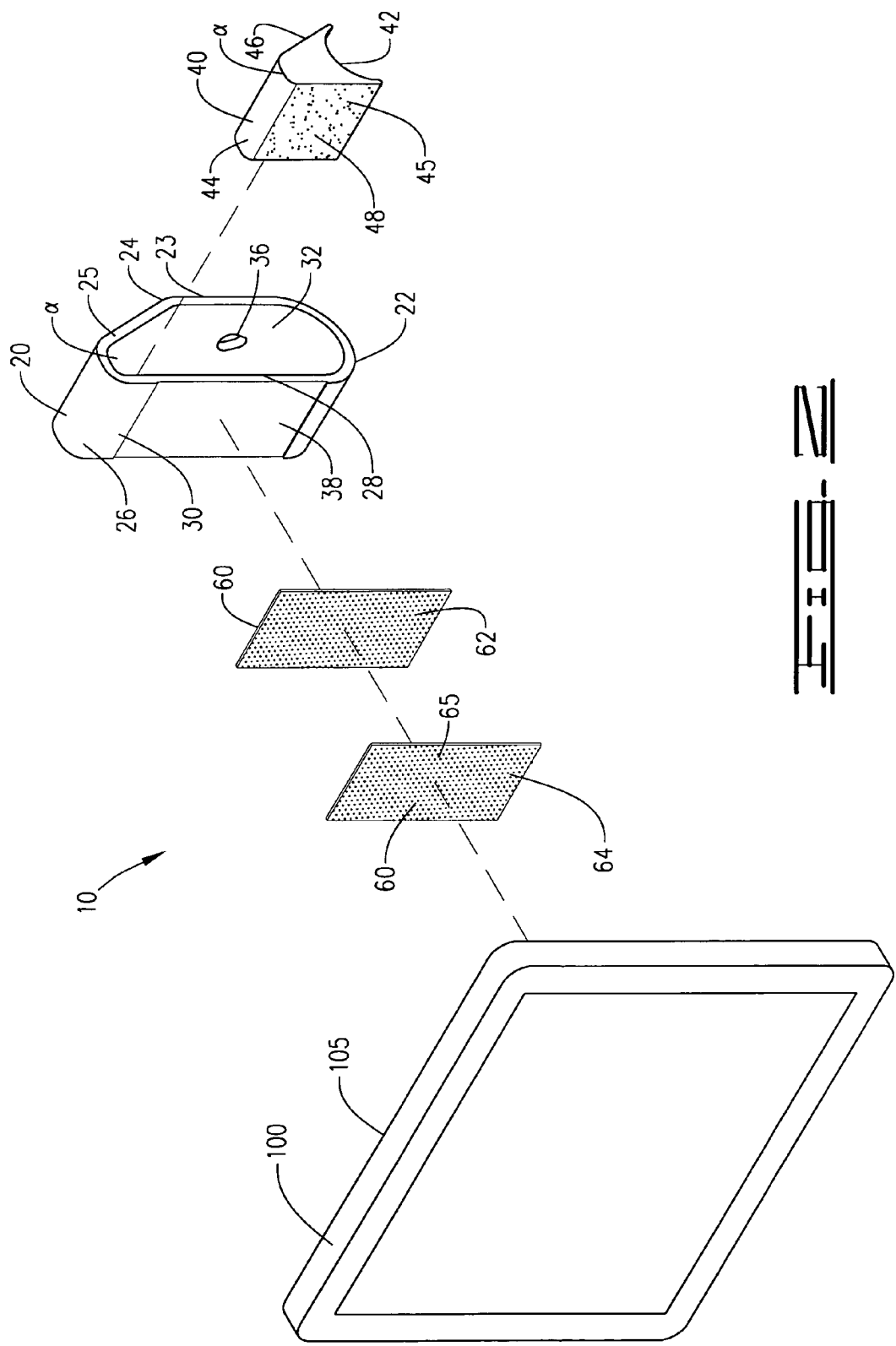

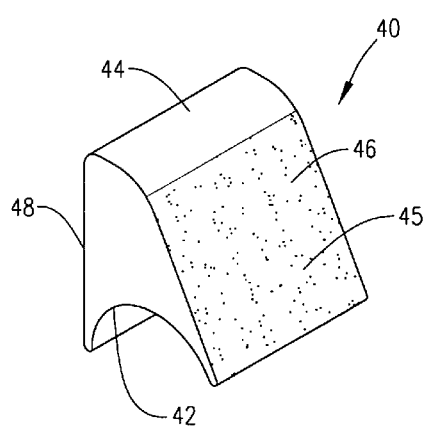
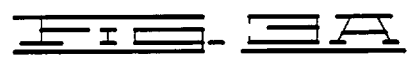
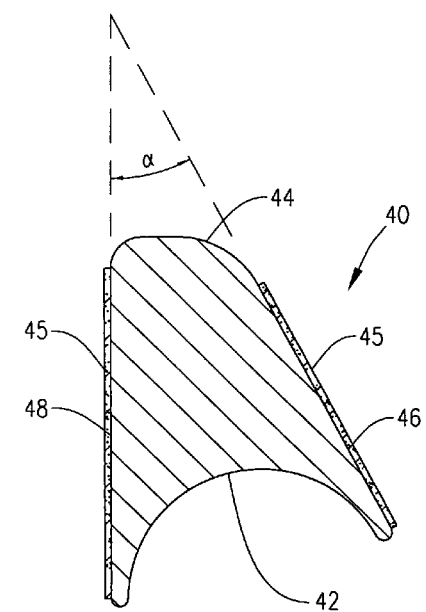
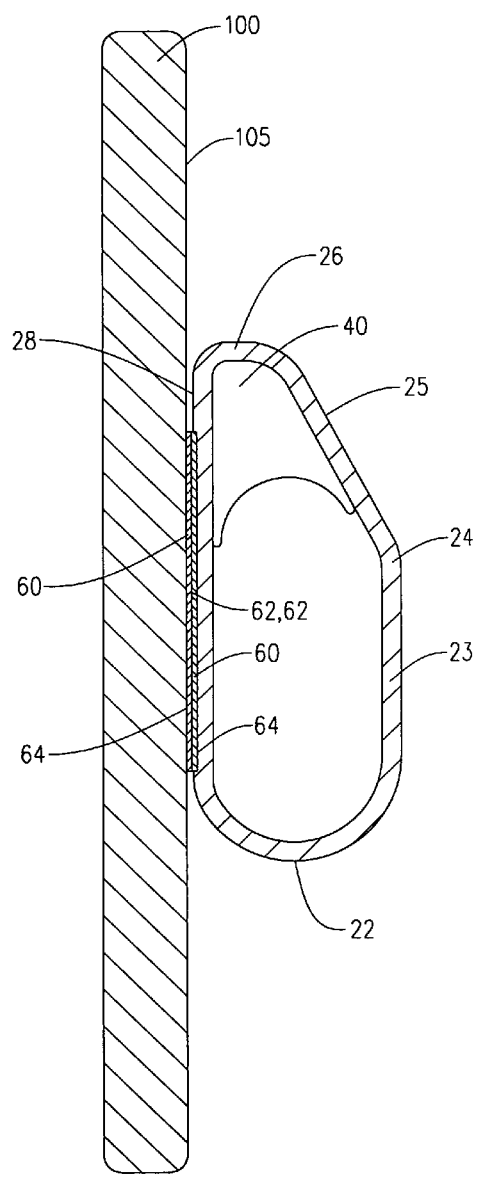
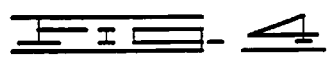

DETACHABLE HANDPIECE

CROSS REFERENCE TO RELATED APPLICATIONS

None.

BACKGROUND OF THE INVENTION

1. Field of Invention

A detachable handpiece coupling by a detachable fabric to a flat surface device, electronic tablet or notebook, or other object held in front of a user, the device conforming to a left or right hand of the user with a selected padded insert within a narrow end of the handpiece to reduce the inner portion of the handpiece to further conform to the user's hand.

2. Description of Prior Art

A preliminary review of prior art patents was conducted by the applicant which reveal prior art patents in a similar field or having similar use. However, the prior art inventions do not disclose the same or similar elements as the present detachable handle, nor do they present the material components in a manner contemplated or anticipated in the prior art.

An elastic base seated against the back of a tablet computer is disclosed in U.S. Patent Application Pub. No. 2013/0105662 to Cote, which includes four arms meeting a common center and attaching to the four corners fo the tablet connector by a button connection, the tablet connector receiving the tablet within its framework. A screw connected handle forming an expanded ridge for grasping in U.S. Patent Pub. No. 2012/0297575 to Garcia.

A frame having a handle within which a tablet is placed is disclosed in U.S. Pat. No. D691,146 to Perez. A tablet and cell phone support system is disclosed in a surprisingly issued design patent, U.S. Pat. No. D687,835 to Gittiins. A support stand is shown in U.S. Pat. No. D687,832 to Edwards, U.S. Pat. No. D676,851 to Finnegan, having a pliable foam end that form a secure attachment to two ends of the tablet. In U.S. Pat. No. D675,627 to Rouser, a folding encasement is shown within which a tablet is carried, the encasement forming a handle. A table handle and stand having a rounded connecting portion and a moveable and adjustable handpiece which is moveable to adjust the handle to a selected angle extending from the handpiece is disclosed in U.S. Pat. No. D673,573 to Skene, although no connection is actually disclosed within the patent.

SUMMARY OF THE INVENTION

Electronic tablet, cell phones and other electronic handheld devices are fragile and very expensive to repair or replace. It is quite common that they are subject to being dropped or otherwise damaged by accident or mishandling. There are other devices that present a flat surface for viewing that are hand-held which are difficult to retain in the palm of the hand without a resulting fatigue during prolonged use. As seen in the prior art, other handles are shown which attach to these electronic devices to provide a handle for easier grasp and for additional security.

The present detachable handle is a very simple product. It presents an overall polygonal shaped handle having a flat contact surface attached to the electronic device by a detachable fabric product and an inner handle opening which is contoured to the hand of a user, a padded insert provided in several selected sizes which accompany the product chosen to reduce the handle opening to custom fit the handle opening to the size of the palm of the hand of the user, and the aforementioned detachable product attaching in two mated sections, one attached to the rear surface of the flat object or electronic device, and the other section attached to the outer surface of the palm side of the handle, the two fabric sections attached and detached innumerable times without damage. The handpiece may also be used as an included support and to hang the flat object or electronic device from a hook where a hook aperture is included in the backhand portion of the handle.

DESCRIPTION OF THE DRAWINGS

The following drawings are submitted with this utility patent application.

FIG. 2 is an exploded view of the components of the detachable handpiece.

FIG. 3A is a perspective view of the padded insert.

FIG. 3B is a perspective view of the padded insert.

FIG. 4 is a side cross sectional view of the detachable handle attached to the rear surface of a tablet with a hand shown inserted into the handle opening.

DESCRIPTION OF THE PREFERRED EMBODIMENT

Figure 1:
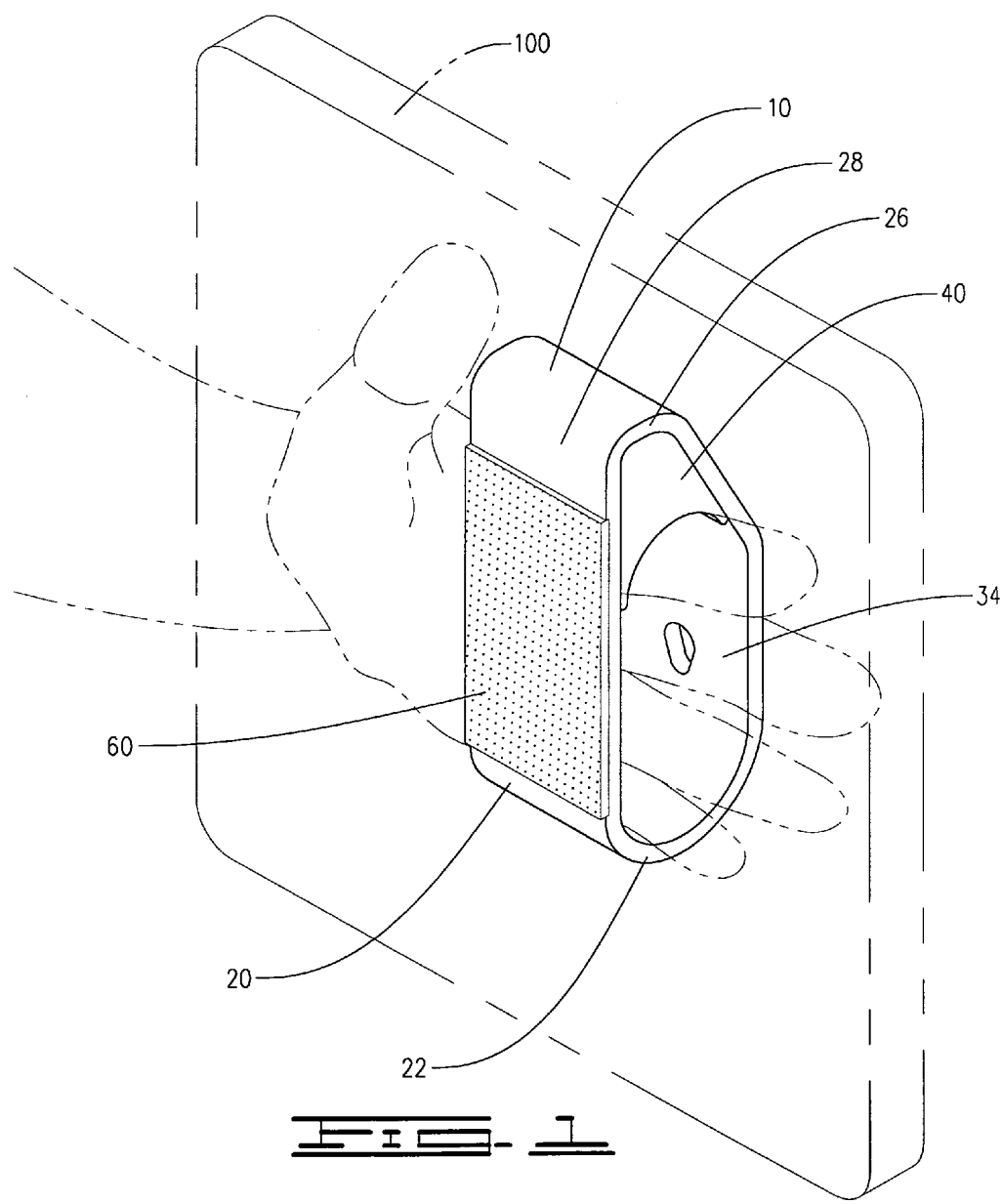
FIG. 1 is a side view of a detachable handpiece attached to the rear surface of a tablet.

A detachable handpiece 10 removably attaching to a flat object 100, including a notebook, electronic tablet or other viewable flat visual display, as shown in FIGS. 1-4 of the drawing figures, promoting an enhanced secure grasp of the flat object 100, the detachable handpiece 10 embodying a polygonal handle 20 defining a rounded end 22, a short non-contact section 23, an angled break 24, a short tapering section 25, a tapered curved end 26, and a long contact section 28, and defining an outer surface 30 and an inner surface 32 defining the palm insert opening 34, the handle forming a continuous and fully connected singular component. As shown in FIGS. 1 and 4, the short non contact section 23 and the long contact section 28 are parallel with one another, with the short tapering section 25 and the long contact section 28 forming an acute angle α.

A plurality of contoured padded inserts 40, one embodiment shown in FIGS. 2, 3A and 3B, of differing depths, the selected contoured padded insert appropriately sized by depth to the user's hand, is attached by an adhesive 45 within the inner surface 32 of the tapered curved end 26 of the handle 20. A detachable two piece connecting fabric material 60, FIGS. 2 and 4, is incorporated within the detachable handpiece 10, with one section of the detachable fabric material attaching by an adhesive 65 to the outer surface 30 of the long contact section 28 with the other section of the detachable fabric material 60 attaching by an adhesive 65 to a rear surface 105 of the flat object 100, FIG. 1. Each section of the detachable fabric material 60 defines a detachable connecting surface 62 and a secure attaching adhesive surface 64, the adhesive surface 64 attaching to the outer surface 30 of the handle 20 or the rear surface 105 of the flat object 100. Preferred examples of a detachable two piece connecting fabric material 60 include VELCRO®, and where a less noisy detachment is desired, the DURALOCK® product by 3M.

Further feature which may also be included within the handle 20 include a formed aperture 36 through the handle 20 on the short non-contact section 23 for hanging the detachable handpiece 10, FIG. 2. There may also be an inward depression 38 in the outer surface 30 of the long contact section 28, FIG. 2, to accommodate the associated section of the detachable two piece connecting fabric material 60. Each padded insert 40, shown in isolation in FIGS. 3A and 3B, defines a concave inner curved portion 42 facing the palm insert opening 34 and partially defining the shape of the palm insert opening 34, an acute angular outer curved portion 44, an upper flat surface portion 46 and a lower flat surface portion 48, the upper and lower flat surface portions 46, 48, increasing uniformly in distance from one another from the outer curved portion 44 to the inner curved portion 42. The adhesive 45 is applied to the upper flat surface portion 46, the lower flat surface portion 48, and the outer curved portion 44, the adhesive 45 securing the padded insert 40 to the inner surface 32 of the tapered curved end 26 of the handle 20.

The best mode dimensions for the handle 20 in the prototype studies indicate the measurements of the handle 20 defining an overall length of approximately five inches, a width of approximately 1.7 inches and an exterior depth of 2 inches and an interior depth between the short non-contact section and long contact section of 1.6 inches. The padded insert 40 would define a width of approximately 1.5 inches with the acute angle between the upper and lower flat surface portions 46, 48 of approximately 25 to 30 degrees. The preferred range of lengths of the lower surface portion would be between 1 inch and 1.7 inches. Custom sizing of the handle 20 and the padded insert 40 would also be available for extra small or extra large hand sizes for users. The preferred choice of material for the handle 20 would be a molded plastic or other lightweight material and the padded insert 40 is preferably compressible foam rubber with an outer rubber coating from prototype testing and from an economically practical standpoint. By using the molded plastic material for the handle 20, a range of colors and pressed or formed logos could be employed in the molds forming the handle.

The most practical use for the detachable handpiece 10 is in application of the handpiece to an electronic tablet or notebook. At present, a tablet or notebook user is required to hold the tablet or notebook in the open palm of the user's hand, right or left. It is difficult to determine just what causes a user to drop the notebook or tablet during use, but it is overwhelmingly common for a tablet or notebook to be dropped. When these devices are dropped, there is seldom any such thing as minimal damage. The screen of the electronic device usually costs as much to replace or repair as the cost of the entire device and success is quite limited on repairs to a dropped electronic device. They never seem to work the same. Thus, the best insurance to prevent damage to these device is to reduce the chance of dropping one of them. The best way to reduce the chance of dropping the device is to provide the device with a means of removably securing a handle to the device that provides the user with a more secure grasp of the tablet or notebook during use, especially one that conforms comfortably to the palm of the hand and actually secures upon the hand is a relatively snug and custom fitted engagement, FIG. 4.

Once the connecting surfaces 62 of the two detachable two piece connecting fabric materials 60 are securely engaged together after being adhesively applied to the respective rear surface 105 of the electronic device 100 and the long contact section 28 of the handle 20, the user slides the four fingers of his hand into the palm insert opening 34 with the thumb oriented in the direction of the tapered curved end 26, placing the selected and now adhesively attached contoured padded insert 40 against the crook of the hand defined by the thumb and forefinger, as shown in FIG. 4 of the drawings. Once applied, the hand can be slightly bent while within the palm insert opening and the user can actually move their hand in any direction without resultant disengagement of the handle 20 and the attached flat object 100. This custom fitted snug engagement is provided both by the size and contour of the handle 20 and the inclusion of the padded inset 40 within the inner surface 32 and tapered curved end 26 as chosen by the user most appropriate suited for the size of the user's hand.

While the detachable handpiece 10 has been particularly shown and described with reference to a preferred embodiment thereof, it will be understood by those skilled in the art that changes in form and detail may be made therein without departing from the spirit and scope of the invention.

What is claimed is:

1. A detachable handpiece applied to a flat object to promote an enhanced secure grip of the flat object, the detachable handpiece comprising:
   a polygonal shaped singular handle defining a rounded end, a short non-contact section, an angled break, a short tapering section, a tapered curved end and a long contact section further defining an inner surface and outer surface and a palm insert opening;
   two sections of detachable fabric material, each section defining an adhesive surface and a detachable contact surface, wherein said adhesive surface of one of said two sections of detachable fabric material is attached to said outer surface upon said long contact section of said handle and said adhesive surface of said other of said two sections of detachable fabric material is attached to a rear surface of said flat object, thereby attaching said detachable contact surfaces together as said handle is attached to said flat object; and at least one contoured padded insert defining a concave inner curved portion, an acute angular outer curved portion, an upper flat surface portion and a lower flat surface portion, said upper and lower flat surface portions increasing uniformly in distance from one another from said outer curved portion to said inner curved portion, said padded insert adhesively applied within said inner surface of said handle within said tapered curved end, said at least one contoured padded insert reducing the area of said palm insert opening to a size conforming to a hand of the user.

2. The detachable handpiece as disclosed in claim 1, said detachable fabric material being selected from a group of detachable fabric materials comprising VELCRO®, DUR-ALOCK®, or a fabric material possessing the physical characteristics of long term adhesion to a flat surface, repeated detachment and attachment without deformation of the contact surfaces, and contact surface forming a secure connection until an intentional force is applied to detach the attached connecting surfaces.

3. The detachable handpiece as disclosed in claim 1, said handle further comprising a formed aperture through said handle within said short non-contact section providing a hanging means for said handle, and an inward depression in said outer surface of said long contact section wherein said adhesive surface of one of two said sections of said connecting fabric materials is adhesively applied within said inward depression.

4. A detachable handpiece applied to a flat object to promote an enhanced secure grip of the flat object, the detachable handpiece comprising:
   a polygonal shaped singular handle defining a rounded end, a short non-contact section, an angled break, a short tapering section, a tapered curved end and a long contact section further defining an inner surface and outer surface and a palm insert opening;
   at least one contoured padded insert adhesively applied within said inner surface of said handle within said tapered curved end, said padded insert reducing the size of said palm insert opening to a size conforming to a hand of the user; and two sections of detachable fabric material, each section defining an adhesive surface and a detachable contact surface, wherein said adhesive surface of one of said two sections of detachable fabric material is attached to said outer surface upon said long contact section of said handle and said adhesive surface of said other of said two sections of detachable fabric material is attached to a rear surface of said flat object, thereby attaching said detachable contact surfaces together as said handle is attached to said flat object.

5. The detachable handpiece as disclosed in claim 4, wherein said flat object is an electronic tablet or notebook.

6. The detachable handpiece as disclosed in claim 4, said handpiece further comprising said at least one contoured padded insert defining a concave inner curved portion, an acute angular outer curved portion, an upper flat surface portion and a lower flat surface portion, said upper and lower flat surface portions increasing uniformly in distance from one another from said outer curved portion to said inner curved portion, said padded insert adhesively applied within said inner surface of said handle within said tapered curved end, said at least one contoured padded insert reducing the area of said palm insert opening to a size conforming to a hand of the user.

7. The detachable handpiece as disclosed in claim 4, said detachable fabric material being selected from a group of detachable fabric materials comprising VELCRO®, DURALOCK®, or a fabric material possessing the physical characteristics of long term adhesion to a flat surface, repeated detachment and attachment without deformation of the contact surfaces, and contact surface forming a secure connection until an intentional force is applied to detach the attached connecting surfaces.

8. The detachable handpiece as disclosed in claim 4, said handle further comprising a formed aperture through said handle within said short non-contact section providing a hanging means for said handle, and an inward depression in said outer surface of said long contact section wherein said adhesive surface of one of two said sections of said connecting fabric materials is adhesively applied within said inward depression.

9. The detachable handpiece as disclosed in claim 4, said handle defining an overall length of approximately five inches, a width of approximately 1.7 inches and an exterior depth of 2 inches and an interior depth between the short non-contact section and long contact section of 1.6 inches, said padded insert defining a width of approximately 1.5 inches with an acute angle between the upper and lower surface portions of approximately 25 to 30 degrees and a range of lengths of said lower surface portion between 1 inch and 1.7 inches.

\* \* \* \* \*